United States Patent
Ljung et al.

(10) Patent No.: US 9,942,786 B2
(45) Date of Patent: Apr. 10, 2018

(54) SIGNAL QUALITY MEASUREMENT IN CELLULAR NETWORKS

(71) Applicant: Sony Mobile Communications Inc., Tokyo (JP)

(72) Inventors: Rickard Ljung, Helsingborg (SE); Peter C. Karlsson, Lund (SE)

(73) Assignee: Sony Mobile Communications Inc., Tokyo (JP)

( * ) Notice: Subject to any disclaimer, the term of this patent is extended or adjusted under 35 U.S.C. 154(b) by 79 days.

(21) Appl. No.: 14/982,337

(22) Filed: Dec. 29, 2015

(65) Prior Publication Data

US 2017/0105133 A1 Apr. 13, 2017

(30) Foreign Application Priority Data

Oct. 9, 2015 (WO) .................. PCT/EP2015/073359

(51) Int. Cl.
*H04W 24/08* (2009.01)
*H04W 72/04* (2009.01)
*H04W 72/08* (2009.01)

(52) U.S. Cl.
CPC ....... *H04W 24/08* (2013.01); *H04W 72/0406* (2013.01); *H04W 72/0446* (2013.01); *H04W 72/085* (2013.01)

(58) Field of Classification Search
CPC .................................................. H04W 24/08
See application file for complete search history.

(56) References Cited

U.S. PATENT DOCUMENTS

| 5,521,963 A * | 5/1996 | Shrader | H04Q 11/0428 370/332 |
|---|---|---|---|
| 2013/0058234 A1* | 3/2013 | Yang | H04L 27/261 370/252 |
| 2015/0146530 A1 | 5/2015 | Jung et al. | |
| 2015/0327098 A1* | 11/2015 | Chai | H04W 24/08 370/252 |
| 2015/0381431 A1* | 12/2015 | Jung | H04L 41/0816 370/329 |
| 2016/0050534 A1* | 2/2016 | Lim | G01S 5/0236 370/252 |

FOREIGN PATENT DOCUMENTS

EP 2627121 A1 8/2013
EP 2928222 A1 10/2015

OTHER PUBLICATIONS

3rd Generation Partnership Project; Technical Specification Group Radio Access Network; Evolved Universal Terrestrial Radio Access (E-UTRA);Radio Resource Control (RRC); Protocol specification (Release 12); 3GPP TS 36.331 V12.6.0 (Jun. 2015).

(Continued)

*Primary Examiner* — Min Jung
(74) *Attorney, Agent, or Firm* — James C. Edwards; Moore & Van Allen PLLC

(57) ABSTRACT

At least one control message is received, from a cellular network. The at least one control message indicates a measurement band (300). A measurement of a signal quality of a signal received on the measurement band (300) is executed. The measurement band (300) differs from the bands (200) of at least one cell (101, 102, 103) of the cellular network.

20 Claims, 10 Drawing Sheets

(56) References Cited

OTHER PUBLICATIONS

3rd Generation Partnership Project; Technical Specification Group Radio Access Network; Evolved Universal Terrestrial Radio Access (E-UTRA); Physical layer; Measurements (Release 12); 3GPP TS 36.214 V12.2.0 (Mar. 2015).
International Search Report and Written Opinion; dated Jun. 16, 2016; issued in International Patent Application No. PCT/EP2015/073359.

* cited by examiner

SIGNAL QUALITY MEASUREMENT IN CELLULAR NETWORKS

TECHNICAL FIELD

Various embodiments relate to a device configured to execute a measurement of a signal quality and to a corresponding method. Various embodiments relate to a network node of a cellular network configured to send at least one control message prompting to execute a measurement of a signal quality and to a corresponding method.

BACKGROUND

Cellular networks are widely used to facilitate mobile communication. Different radio access technologies (RATs) are known including such as specified by the Third Generation Partnership Project (3GPP). 3GPP RATs include the Long Term Evolution (LTE) protocol, the Universal Mobile Telecommunications System (UMTS) protocol and the Global System for Mobile Communication (GSM).

E.g., for the LTE RAT it is known to prompt a terminal connected to the cellular network via the LTE Evolved Universal Terrestrial Radio Access (E-UTRA) radio interface to measure and report a signal quality of the signal received in the band of a certain cell of the cellular network, see, e.g., 3GPP Technical Specification (TS) 36.331 V.12.6.0 (2015), section 5.5 "Measurements".

However, such techniques face certain restrictions and drawbacks. E.g., according to reference implementations, a request for a measurement is directed to a measurement band which corresponds with a band of a cell of the cellular network.

SUMMARY

Therefore, a need exists for advanced techniques of measuring a signal quality in cellular networks. In particular, a need exists for techniques of flexibly measuring the signal quality in various measurement bands.

This need is met by the features of the independent claims. The dependent claims define embodiments.

According to an aspect, a device is provided. The device comprises an analogue transceiver configured to wirelessly transceive on bands of at least one cell of a cellular network. The device further comprises a data interface coupled with the analogue transceiver. The data interface is configured to communicate, via the analogue transceiver, with the cellular network. The device further comprises at least one processor coupled with the data interface. The at least one processor is configured to receive, from the cellular network and via the data interface, at least one control message. The at least one control message indicates a measurement band. The at least one processor is configured to control the analogue transceiver to execute a measurement of a signal quality of a signal received on the measurement band.

In some scenarios, the measurement band may differ from the bands of the at least one cell. In some scenarios, alternatively or additionally, the at least one control message may include an indicator indicating the measurement band in absolute terms. In some scenarios, alternatively or additionally, the at least one control message may include an indicator indicating the measurement band in relative terms with respect to at least one of a bandwidth of the band of a target cell of the at least one cell and a centre frequency of the band of the target cell.

In some scenarios, the device may be a terminal connected to the cellular network.

In some scenarios, the device may be an access point node of the cellular network.

According to an aspect, a method is provided. The method comprises receiving, from a cellular network, at least one control message. The at least one control message indicates a measurement band. The method further comprises controlling an analogue transceiver to execute a measurement of a signal quality of a signal received on the measurement band.

In some scenarios, the measurement band may differ from the bands of the at least one cell. In some scenarios, alternatively or additionally, the at least one control message may include an indicator indicating the measurement band in absolute terms. In some scenarios, alternatively or additionally, the at least one control message may include an indicator indicating the measurement band in relative terms with respect to at least one of a bandwidth of the band of a target cell of the at least one cell and a centre frequency of the band of the target cell.

According to an aspect, a network node of a cellular network is provided. The network node comprises a data interface configured to communicate with a terminal connected with the cellular network via a connected cell of at least one cell of the cellular network. The network node comprises at least one processor coupled with the data interface. The at least one processor is configured to send, to the terminal and via the data interface, at least one control message. The at least one control message indicates a measurement band and prompts the terminal to execute a measurement of a signal quality of a signal received on the measurement band.

In some scenarios, the measurement band may differ from the bands of the at least one cell. In some scenarios, alternatively or additionally, the at least one control message may include an indicator indicating the measurement band in absolute terms. In some scenarios, alternatively or additionally, the at least one control message may include an indicator indicating the measurement band in relative terms with respect to at least one of a bandwidth of the band of a target cell of the at least one cell and a centre frequency of the band of the target cell.

According to an aspect, a method is provided. The method comprises sending, to a terminal connected with the cellular network via a connected cell of at least one cell of the cellular network, at least one control message. The at least one control message indicates a measurement band. The at least one control message prompts the terminal to execute a measurement of a signal quality of a signal received on the measurement band.

In some scenarios, the measurement band may differ from the bands of the at least one cell. In some scenarios, alternatively or additionally, the at least one control message may include an indicator indicating the measurement band in absolute terms. In some scenarios, alternatively or additionally, the at least one control message may include an indicator indicating the measurement band in relative terms with respect to at least one of a bandwidth of the band of a target cell of the at least one cell and a centre frequency of the band of the target cell.

According to an aspect, a computer program product comprising program code to be executed by at least one processor is provided. Executing the program code by the at least one processor causes the at least one processor to execute a method. The method comprises receiving, from a cellular network, at least one control message. The at least one control message indicates a measurement band. The method further comprises controlling an analogue transceiver to execute a measurement of a signal quality of a signal received on the measurement band.

In some scenarios, the measurement band may differ from the bands of the at least one cell. In some scenarios, alternatively or additionally, the at least one control message may include an indicator indicating the measurement band in absolute terms. In some scenarios, alternatively or additionally, the at least one control message may include an indicator indicating the measurement band in relative terms with respect to at least one of a bandwidth of the band of a target cell of the at least one cell and a centre frequency of the band of the target cell.

According to an aspect, a computer program product comprising program code to be executed by at least one processor is provided. Executing the program code by the at least one processor causes the at least one processor to execute a method. The method comprises sending, to a terminal connected with the cellular network via a connected cell of at least one cell of the cellular network, at least one control message. The at least one control message indicates a measurement band. The at least one control message prompts the terminal to execute a measurement of a signal quality of a signal received on the measurement band.

In some scenarios, the measurement band may differ from the bands of the at least one cell. In some scenarios, alternatively or additionally, the at least one control message may include an indicator indicating the measurement band in absolute terms. In some scenarios, alternatively or additionally, the at least one control message may include an indicator indicating the measurement band in relative terms with respect to at least one of a bandwidth of the band of a target cell of the at least one cell and a centre frequency of the band of the target cell.

It is to be understood that the features mentioned above and features yet to be explained below can be used not only in the respective combinations indicated, but also in other combinations or in isolation, without departing from the scope of the present invention. Features of the above-mentioned aspects and embodiments may be combined with each other in other embodiments.

BRIEF DESCRIPTION OF THE DRAWINGS

The foregoing and additional features and effects of the invention will become apparent from the following detailed description when read in conjunction with the accompanying drawings, in which like reference numerals refer to like elements.

FIG. 3 illustrates bands of the plurality of cells of the cellular network of FIG. 1, wherein FIG. 3 illustrates a time-frequency resource allocation scheme associated with the bands of the plurality of cells according to various scenarios.

FIG. 4 illustrates measurement bands for which execution of a measurement of a signal quality is prompted and executed according to various embodiments, wherein FIG. 4 illustrates the measurement bands with respect to the band of a given one of the plurality of cells of FIG. 1.

DETAILED DESCRIPTION OF EMBODIMENTS

Figure 1:
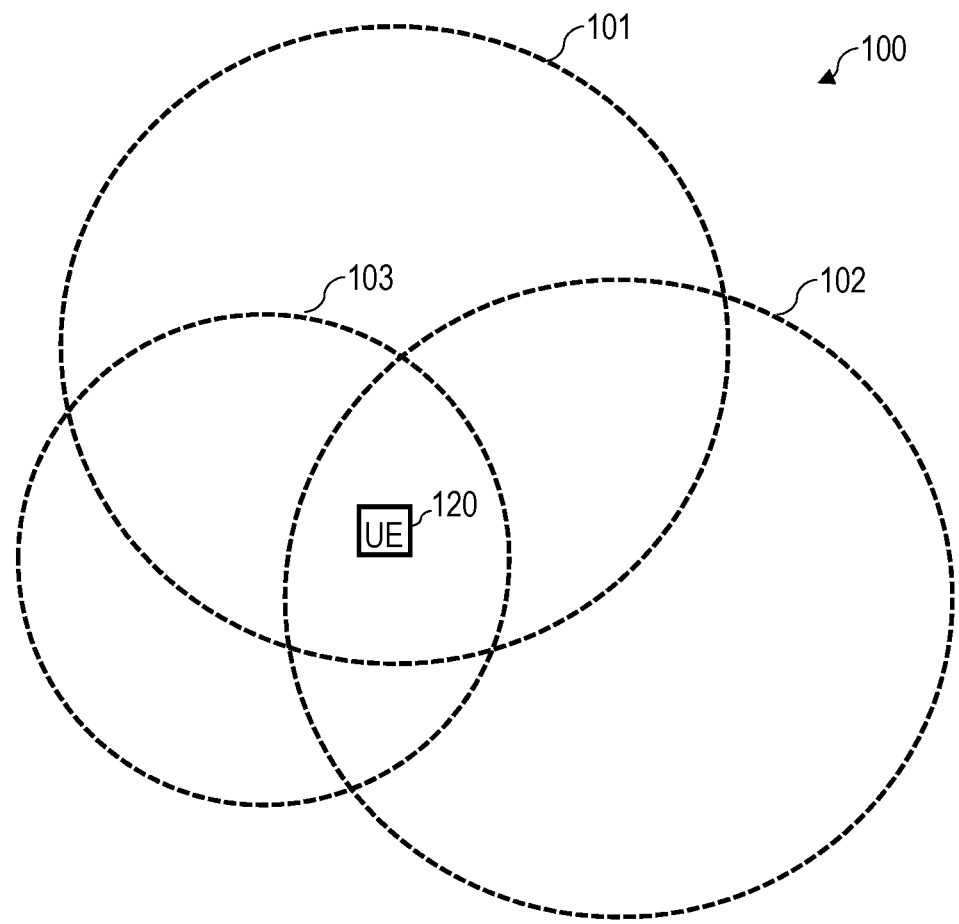
FIG. 1 is a schematic illustration of a plurality of cells of a cellular network.

Exemplary embodiments of the invention will be described with reference to the drawings. While some embodiments will be described in the context of specific fields of application, e.g. in the context of certain spectral ranges and communication techniques, the embodiments are not limited to this field of application. The features of the various embodiments may be combined with each other unless specifically stated otherwise.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter techniques of measuring a signal quality of a signal received on a measurement band are illustrated. The band may define a frequency section of the electromagnetic spectrum, e.g., in the range of 500 MHz-6 GHz, but also above 6 GHz for modern radio access technologies. The band may be specified by an upper frequency, a lower frequency, a center frequency, a bandwidth, etc.

Generally, the techniques may be applied for a signal communicated in uplink (UL) or downlink (DL) direction between a terminal (UE) and a cellular network. As such, the measurement may be executed by the UE for DL or an access point node of the cellular network for UL.

According to various embodiments, a device comprises an analogue transceiver, a data interface, and at least one processor. The analogue transceiver is configured to wirelessly transceive on bands of at least one cell of a cellular network. The data interface is coupled with analogue transceiver and is configured to communicate, via the analogue transceiver, with the cellular network. The at least one processor is coupled with the data interface and configured to receive from the cellular network and via the data interface, at least one control message. The at least one control message indicates a measurement band. The at least one processor is configured to control the analogue transceiver to execute a measurement of a signal quality of a signal received on the measurement band.

In some scenarios, the measurement band may differ from the bands of the at least one cell. E.g., the measurement band may differ from the bands of cells located in the vicinity of the device. In some scenarios, the at least one control message may indicate the measurement band in absolute terms; here, no specific relationship with respect to the bands of the at least one cell may be required. In some scenarios, the at least one control message may indicate the measurement in relative terms with respect to the band of a target cell of the at least one cell.

By the techniques described herein, it becomes possible to flexibly prompt and execute measurements of the signal quality for various measurement bands. In particular, execution of the measurements is not tied to the existing portioning of the spectrum by the bands of existing cells.

Hereinafter, various scenarios will be described referring to the 3GPP LTE RAT. However, this is for illustrative purposes only and similar techniques may be readily applied to various kinds of RATs including, but not limited to: UMTS, GSM.

The particular type of the signal quality that is measured is not germane for the functioning of the various examples disclosed herein. E.g., according to various examples, the measured signal quality may be selected from the group comprising: a received signal strength; a Receive Signal Strength Indicator (RSSI); an average total received power of a plurality of reference symbols; a received signal power; a reference signal received power (RSRP); a relation between a received signal strength and the received signal power; a Reference Signal Received Quality (RSRQ).

RSRP may be defined as the linear average over the power contributions, e.g., in Watts, of the resource elements that carry cell-specific reference signals within the considered measurement band. See 3GPP TS 36.214 v12.2.0, 2015-03, section 5.1.1.

RSSI may be defined as the integral power received in the considered measurement band. See 3GPP TS 36.214 v12.2.0, 2015-03, section 5.1.5

RSRQ may be determined based on the RSSI and RSRP and the number of used resource blocks (RBs), i.e., by RSRQ=(N*RSRP)/RSSI measured over the same bandwidth. See 3GPP TS 36.214 v12.2.0, 2015-03, section 5.1.3

FIG. 1 schematically illustrates aspects relating to different cells 101-103 of a cellular mobile communications network 100 (abbreviated cellular network, hereinafter, for brevity). As can be seen, a scenario is conceivable, where a UE 120 connected to the cellular network 100 is located such that an analogue transceiver of the UE 120 (not shown in FIG. 1) is able to transceive on the bands of the plurality of cells 101-103. In the example of FIG. 1, the UE 120 is located at an overlapping region where communication with the cellular network 100 is possible via each one of the cells 101-103. The UE 120 is in the range of each one of the cells 101-103.

The type of the UE 120 is not germane for the functioning of the techniques as illustrated herein. In the various scenarios disclosed herein, the UE 120 may be selected from the group comprising: is a mobile device, a mobile phone, a smartphone, tablet, a personal digital assistant, a mobile music player, a smart watch, a wearable electronic equipment, and a mobile computer.

Figure 2:
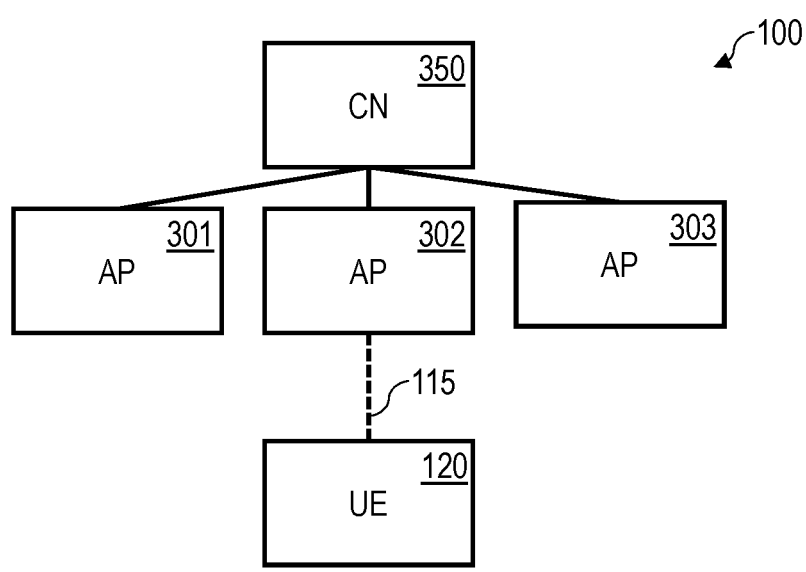
FIG. 2 is a schematic illustration of the architecture of the cellular network of FIG. 1.

FIG. 2 schematically illustrates the architecture of the cellular network 100 in greater detail. As can be seen from FIG. 2, it is possible that the UE 120 is connected with the cellular network 100 via an access point node 302 establishing the cell 102; the given cell 102 to which the UE 120 is connected is referred to as connected cell. A radio interface 115 is present between the access point node 302 and the UE 120 (illustrated by the dashed line in FIG. 2). E.g., communication including packetized or packet-switched (PS) data transmission and/or circuit-switched (CS) communication, e.g., for voice calls, can be implemented via the access point node 302. For this, a network node 350 of a core of the cellular network 100 may be configured to communicate with the UE 120; e.g., the network node 350 may be a gateway node of the data plane providing mobility anchor functionality. In some scenarios, the network node 350 may also be a node of the control plane of the core of the cellular network 100.

Figure 3:
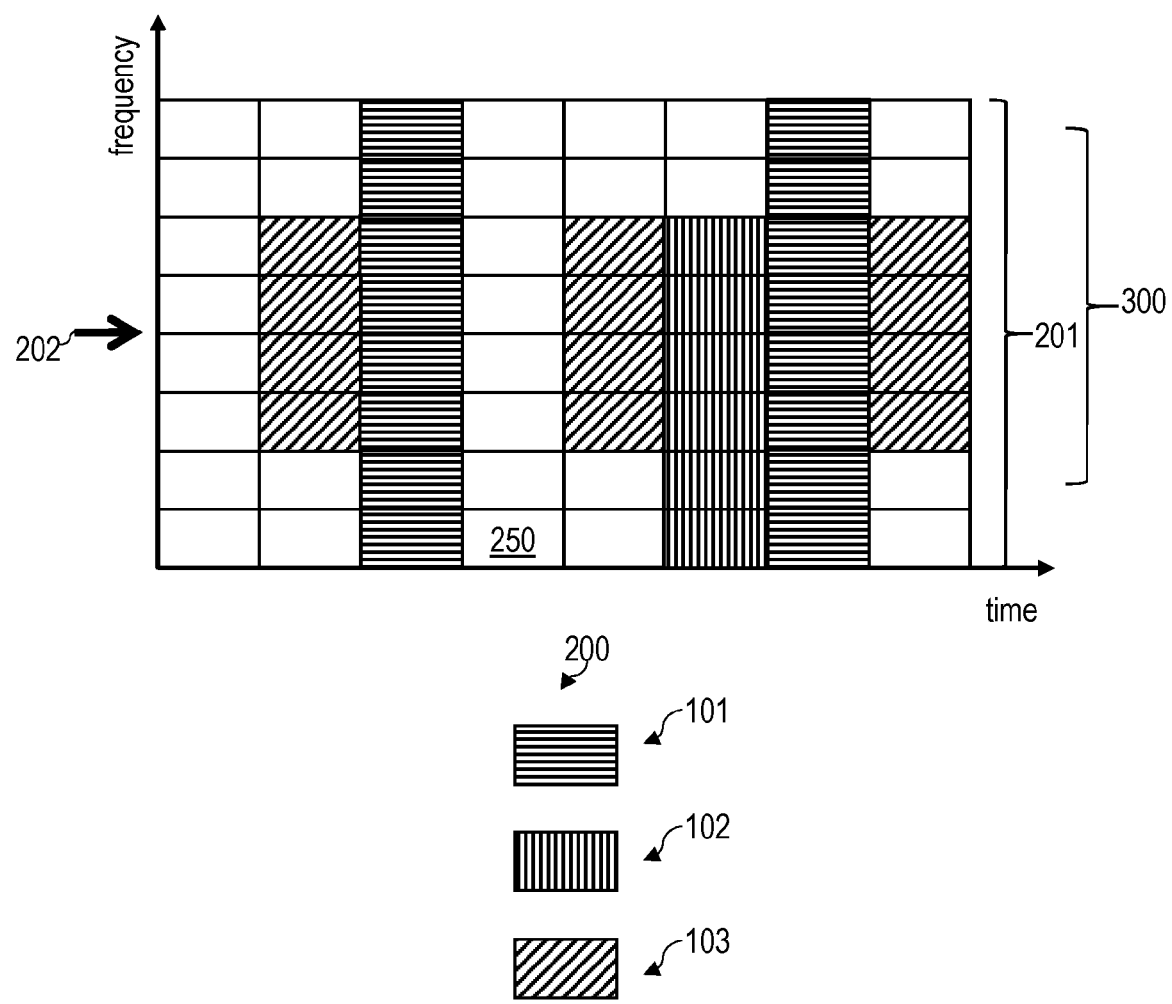

FIG. 3 illustrates aspects of the time-frequency resource allocation scheme employed by the cellular network 100 in order to mitigate interference and/or reduce collisions between data communicated on the bands 200 of the various cells 101-103. FIG. 3 illustrates various time-frequency RBs allocated by the time-frequency resource allocation scheme to the various cells 101-103. As can be seen, the various cells 101-103 have RBs 250 assigned which differ in time and/or frequency. E.g., each RB 250 may comprise a number of sub-carriers which may be employed, e.g., for Orthogonal Frequency-Division Multiplexing (OFDM). For illustrative purposes, the bandwidth 201 and the overall center frequency 202 of the band 200 of the cell 101 is illustrated (illustrated horizontally dashed in FIG. 3).

Sometimes, a handover of the UE 120 from the connected cell 102/the access point node 302 to one of the other cells 101, 103/access point nodes 301, 303 may be desired. For this, according to legacy functionality, it is possible that the cellular network 100, e.g., the access point node 302, sends a control message to the UE 120, the control message prompting the UE 120 to perform a measurement of a signal quality of the signal received on one of the bands 200 of the neighbouring cells 101, 103. According to reference implementations, values such as the RSSI, RSRP, and RSRQ are measured for the integral bands 200 of the neighboring cells 101, 103. E.g., according to the 3GPP LTE RAT, a RRC-ConnectionReconfiguration message may be sent which includes a measurement object that specifies a centre frequency of the band 200 of the respective neighboring cell 101, 103, i.e., the Absolute Radio Frequency Channel Number (ARFCN). Thus, according to reference implementations, execution of the measurement is restricted to the bands 200 of the cells 101-103 of the cellular network 100.

Hereinafter, techniques will be described in detail which enable to prompt and execute a measurement of a signal quality of a signal received on an arbitrarily defined measurement band 300 which, in some scenarios, may be different from the bands 200 of the cells 101-103 of the cellular network 100. This allows to flexibly measure the signal quality as needed. E.g., a frequency-resolved signal quality may be determined.

FIG. 3 also illustrates aspects of flexibly determining the measurement band 300. E.g., in the example of FIG. 3, the measurement band 300 is larger and includes the band 200 of the cell 103, partially overlaps with the band 200 of the cell 102, and is a subfraction of/included in the band 200 of the cell 101. In the various scenarios disclosed herein, all such configurations and further configurations can be applied where the measurement band differs from the bands of the cells 101-103 of the cellular network 100. The measurement band, in the various scenarios disclosed her in, may be arbitrarily defined, i.e., independently of the bands 200 of the cells 101-103 of the cellular network 100.

In some scenarios, the measurement may be defined in absolute terms. This may be convenient where no reference to any cells 101-103 of the cellular network 100 is desired. In other scenarios, the measurement band 300 may be defined in relative terms with respect to a target cell 101-103 of the cellular network 100. This may allow to implement efficient control signalling which, by reference to parameters of the band 200 of the target cell 101-103, precisely defines the measurement band 300 in a lean and efficient manner. Backwards compatibility with reference implementations may also be achieved.

Figure 4:
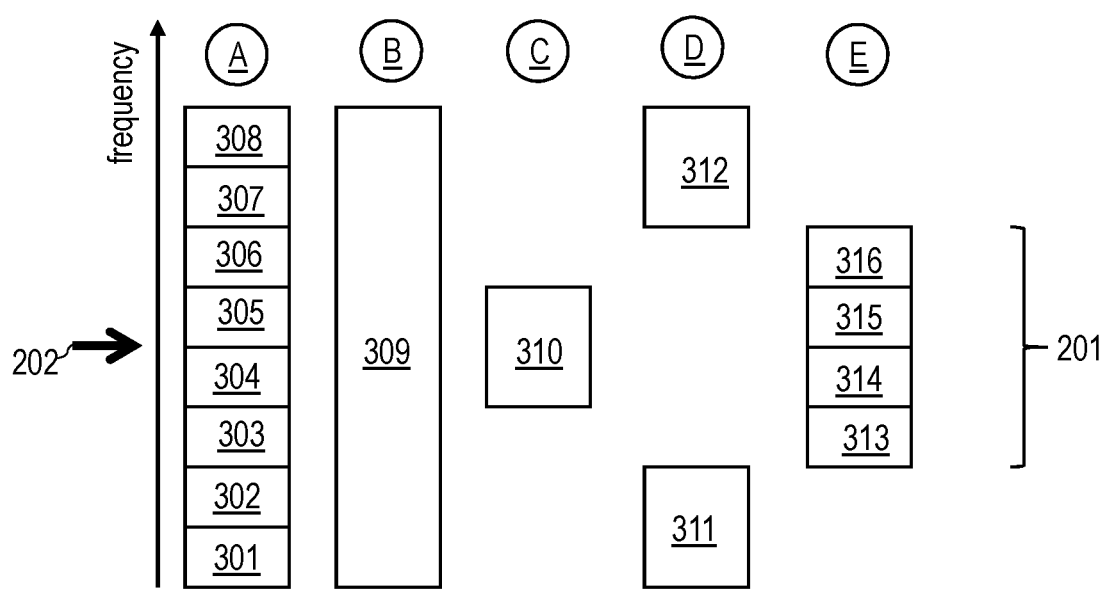

In FIG. 4, various examples with respect to the definition of measurement bands 301-316 in relative terms with respect to the band 200 of a target cell 101-103 are illustrated. In FIG. 4, the bandwidth 201 and the center frequency 202 of a band 200 of the target cell 101-103 are illustrated. E.g., the target cell 101-103 for which the bandwidth 201 and the center frequency 202 are illustrated in FIG. 4 may be the connected cell 102 via which the UE 120 is connected with the cellular network 100 or may be another cell 101, 103. FIG. 4 illustrates example configurations A-E for one or more measurement bands 301-316 for which execution of a measurement of a respective signal quality is prompted and executed.

Example configuration A: measurement of the signal quality is prompted and executed—e.g. serially or at least partly in parallel—for eight measurement bands 301-308 which are arranged adjacent to each other and which extend beyond the given band 200 of the target cell 101-103. Hence, said band 200 of the target cell 101-103 is different from and includes each individual one of the measurement bands 303-306. On the other hand, the combined plurality of measurement bands 301-308 is different from and includes said band 200 of the target cell 101-103.

Example configuration B: measurement of the signal quality is prompted and executed for a single measurement band 309 which extends beyond the band 200 of the target cell 101-103. Hence, the measurement band 309 is different from and includes said band 200 of the target cell 101-103.

Example configuration C: measurement of the signal quality is prompted and executed for a single measurement band 310 which does not extend beyond the band 200 of the target cell 101-103. Hence, said band 200 of the target cell 101-103 is different to and includes the measurement band 310.

Example configuration D: measurement of the signal quality is prompted and executed for two measurement bands 311, 312 which are arranged adjacent and outside the band 200 of the target cell 101-103. Hence, each one of the two measurement bands 311, 312 is different from the band 200 of the target cell 101-103.

Example configuration E: measurement of the signal quality is prompted and executed for four measurement bands 313-316 which are arranged within the band 200 for which the bandwidth 201 and the center frequency 202 are illustrated in FIG. 4. Hence, said band 200 of the target cell 101-103 is different from and includes each one of the measurement bands 313-316.

Figure 5:
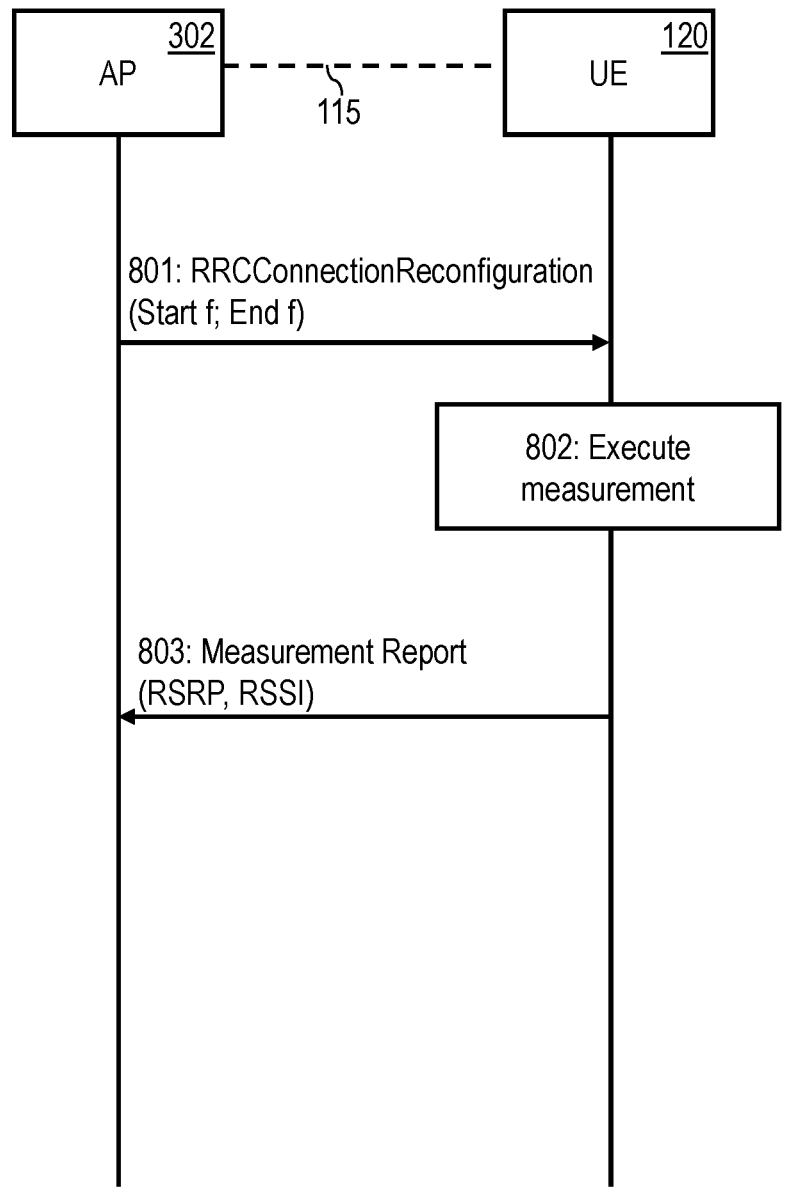
FIG. 5 is a signaling diagram of communication between the cellular network and a terminal connected to the cellular network and executing the measurement of the signal quality according to various embodiments, wherein in the embodiment of FIG. 5 a control message includes an indicator indicating the measurement band in absolute terms.

FIG. 5 is a signaling diagram illustrating aspects with respect to control signaling employed for prompting and reporting the measurement of the signal quality of the signal received on the measurement band 300-316. In particular, FIG. 5 illustrates aspects with respect to indicating the measurement band 300-316 in absolute terms, i.e., without reference to the band 200 of a cell 101-103 of the cellular network 100.

FIG. 5 illustrates a scenario where the UE 120 is connected to the cellular network 100 via the cell 102/the access point node 302. The cell 102 is thus referred to as the connected cell 102.

At some point in time, the access point node 302 sends a control message 801 to the UE 120 in the band 200 of the connected cell 102. In the scenario of FIG. 5, the control message 801 is a RRCConnectionReconfiguration message. In the scenario of FIG. 5, the control message 801 includes an indicator indicating the measurement band 300-316 in absolute terms. In particular, the control message 801 indicates a start frequency and center frequency of the measurement band 300-316. In other scenarios, the control message 801 may indicate a center frequency and a bandwidth of the measurement band 300-316. The various scenarios disclosed herein, it is possible that the control message 801 includes indicators for a plurality of measurement bands 300-316 (see FIG. 4, scenarios A and E).

In the scenario of FIG. 5 the measurement of the signal quality of the signal received on the measurement band 300-316, at 802, can be executed without reference and abstract of the bands 200 of any one of the further cells 301, 303 of the cellular network 100.

Next, a report message 803 is sent by the UE 120 and received by the access point node 302. The report message 803 generally includes an indicator indicating the measured signal quality. The report message 803, in the example of FIG. 5, is a measurement report which includes the RSSI and RSRP measured at 802.

Figure 6:
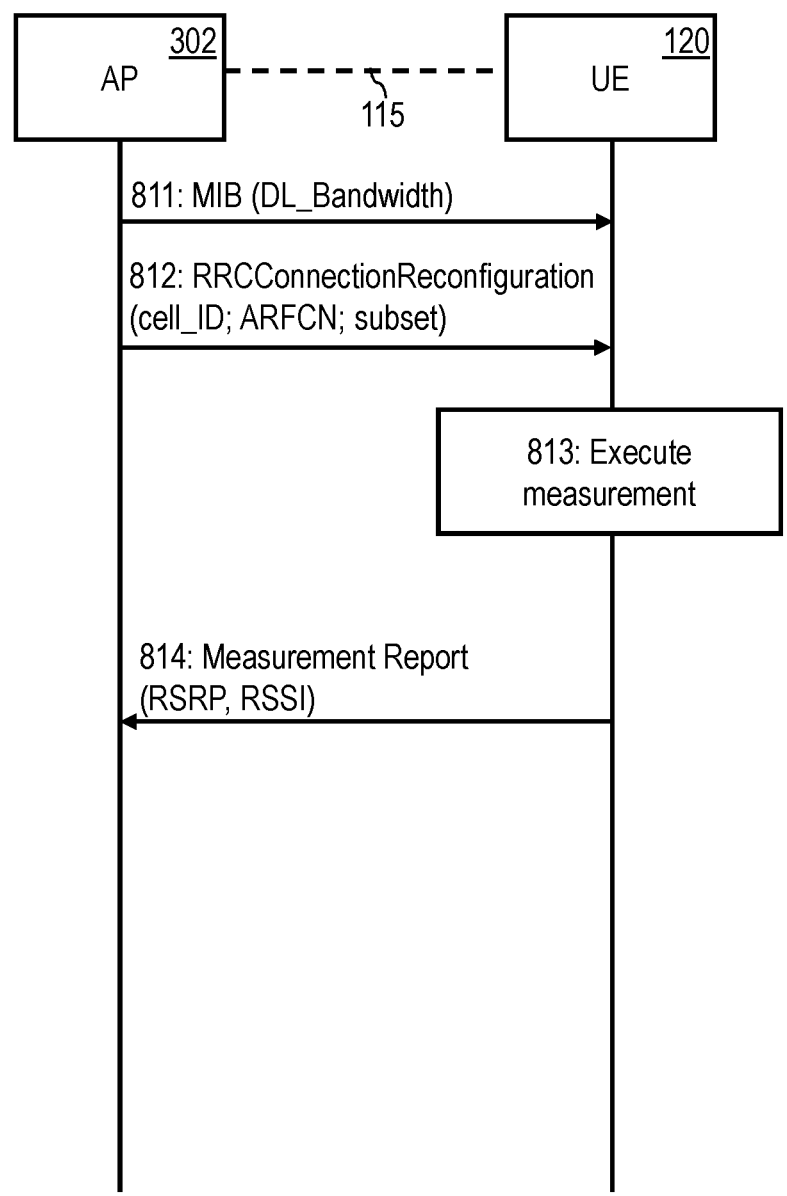
FIG. 6 is a signaling diagram of communication between the cellular network and a terminal executing the measurement of the signal quality according to various embodiments, wherein in the embodiment of FIG. 6 a control message includes an indicator indicating the measurement band in relative terms with respect to a center frequency of a band of a target cell of the plurality of cells of the cellular network.

FIG. 6 is a signaling diagram which generally corresponds to FIG. 5. However, with respect to FIG. 6, a scenario is illustrated where the control message 812 includes an indicator indicating the measurement band 300-316 in relative terms with respect to at least one of a bandwidth 201 of a band 200 of a target cell 101-103 and a center frequency of the band 200 of the target cell 101-103, i.e., by referring somehow to the band 200 of the target cell 101-103 for definition of the measurement band 300-313.

Generally, the target cell with respect to which the measurement band 300-316 is indicated can be any cell 101-103 of the cellular network 100. In the example of FIG. 6, the target cell is the connected cell 102 via which the UE 120 is connected with the cellular network 100.

In the scenario of FIG. 6, at some point in time, the UE 120 receives a control message 811 in the form of the Master Information Block (MIB), see 3GPP TS 36.331 V12.6.0 (2015), section 6.2.2 "Message definitions". The control message 811 includes an indicator indicating the bandwidth 201 of the band 200 of the target cell 102, i.e., the parameter dl_Bandwidth. E.g., the indicator may indicate the bandwidth 201 of the band 200 of the target cell 102 explicitly, i.e., by specifying a certain frequency range; and/or implicitly, e.g., by referring to a number of RBs.

The control message 811, in the example of FIG. 6, is communicated in a multicast or broadcast transmission, i.e., not directed exclusively to the UE 120, but to a possibly undefined plurality of recipients. E.g., the access point node 302 may be configured to send the control message 811 at reoccurring points in time, e.g., at a predefined frequency. E.g., the UE 120 may receive the control message 811 during initial attach or handover.

At some later point in time, the access point node 302 sends the control message 812 which is received by the UE 120. The control message 812 includes an indicator which indicates the measurement band 300-316 in relative terms with respect to the center frequency of the band 200 of the target cell 102, i.e., includes the ARFCN indicative of the band 200 of the target cell 102. Further, the control message 812 includes an indicator which indicates the target cell 102, i.e., in the illustrated scenario the cell_ID. Further, the control message 812 indicates a subset or fraction which defines the measurement band 300-316 in relative terms with respect to the bandwidth 201 of the band 200 of the target cell 102, as indicated by the control message 811. E.g., the subset could specify that the measurement band should span half the bandwidth 201 of the band 200 of the target cell 102. E.g., the subset could specify that the measurement band should be offset with respect to the center frequency 202 of the band 200 of the target cell 102 by a certain amount.

While in the scenario of FIG. 5 (FIG. 6) a single (two) control messages 811, 812 are employed, in the various scenarios disclosed herein, generally, a smaller or larger number of control message(s) may be employed for prompting execution of the measurement of the signal quality.

Based on the information included in the two control messages 811, 812, the UE then, at 813, executes the measurement of the signal quality of the signal received on the measurement band 300-316 and sends a measurement report 814. 813 and 814 generally corresponds to 802, 803.

Figure 7:
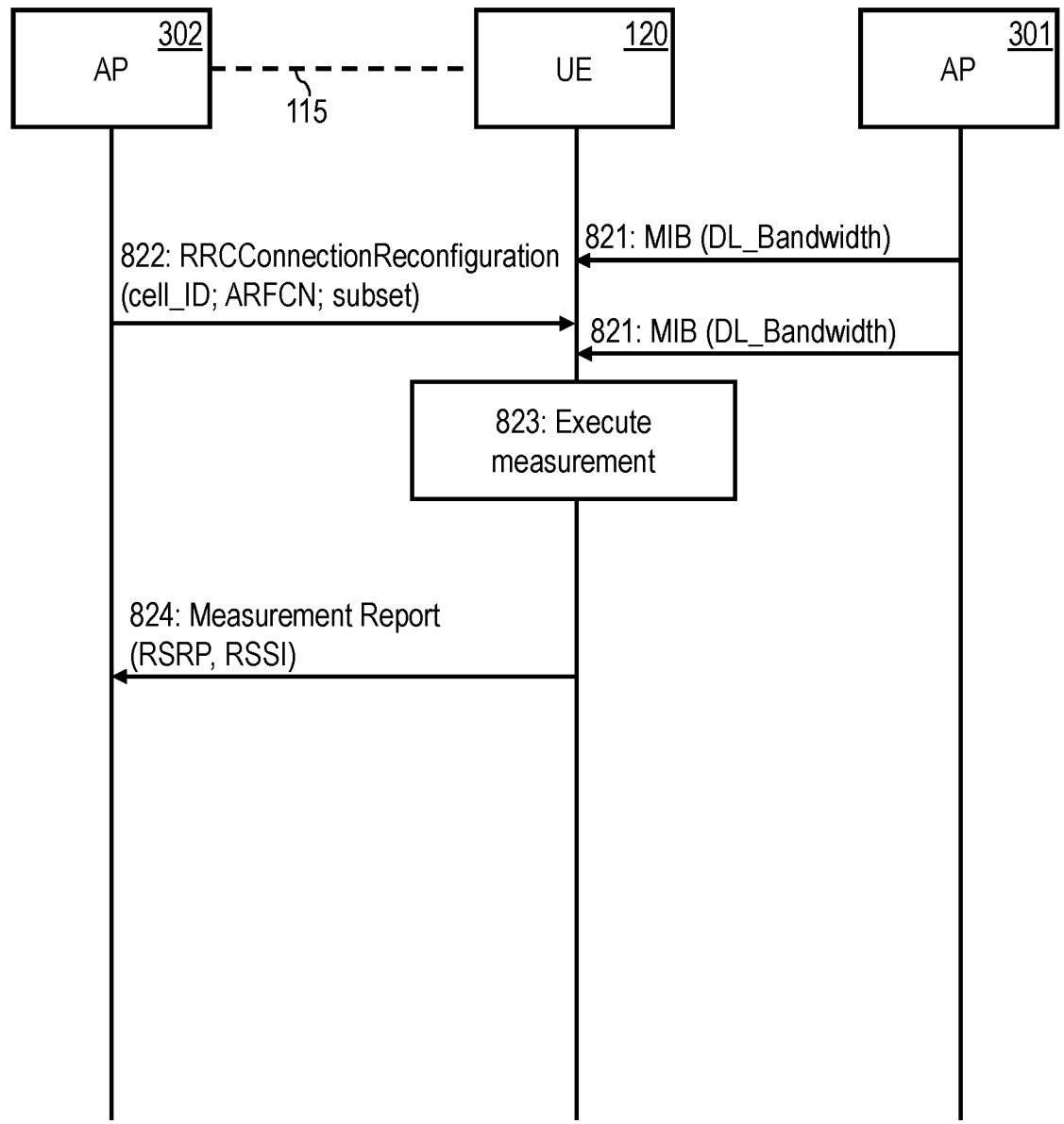
FIG. 7 is a signaling diagram of communication between the cellular network and a terminal executing the measurement of the signal quality according to various embodiments, wherein in the embodiment of FIG. 7 a further control message includes an indicator indicating a bandwidth of the band of a target cell of the plurality of cells of the cellular network.

FIG. 7 is a signaling diagram which generally corresponds to the scenario of FIG. 6. However, while in the scenario of FIG. 6 the measurement band 300-316 is specified in relative terms with respect to the connected cell 102, in the scenario of FIG. 7, the measurement band 300-316 is specified in relative terms with respect to a further cell 101 which is served by the access point node 301 and via which the UE 120 is not connected to the cellular network 100. Hence, the target cell 101 differs from the connected cell 102.

Thus, in the scenario of FIG. 7, the UE 120 receives a broadcasted control message 821 in the form of the MIB from the access point node 301. The UE 120 listens for and receives the control message 821 only in response to receiving the control message 822 which generally corresponds to the control message 812, but indicates the target cell 101. The control message 821 then includes an indicator indicating the bandwidth 201 of the band 200 of the target cell 101.

823, 824 generally correspond to 813, 814.

With respect to FIGS. 5-7, above, example scenarios are disclosed where in response to receiving the control messages 801, 812, 822, respectively, a single report message 803, 814, 824 including an indicator indicating the measured signal quality of the measurement band 200 is sent. Generally, in the various scenarios disclosed herein, it is possible that the request message prompts execution of a plurality of measurements of the signal quality, e.g., in different measurement bands 300-316 or repeatedly in the same measurement band 300-316. E.g., in various scenarios, it may be possible that the request message prompts execution of a plurality of time-spaced measurements of the signal quality on one and the same measurement band 300-316. Alternatively or additionally, it is also possible that the request message prompts execution of a plurality of measurements for a plurality of measurement bands 300-316. Measurement reports may be aggregated into a signal report message to reduce signalling load.

E.g., in some scenarios, it is possible that the control message prompting execution of the measurement of the signal quality of the signal received on the measurement band 300-316 indicates a time schedule; then, it is possible that a plurality of time-spaced measurements of the signal quality of signals received on the measurement band 300-316 are executed based on the time schedule. E.g., the time schedule may specify a frequency with which the plurality of measurements of the signal quality of signals received on the measurement band 300-316 are executed. E.g., the time schedule may prospectively specify points in time at which the plurality of measurements of the signal quality of signals received on the measurement band 300-316 are executed. In such a scenario, it becomes possible to prospectively send the control message that prompts the execution of the plurality of measurements. E.g., the control message may be sent during an initial attach or negotiation phase.

Figure 8:
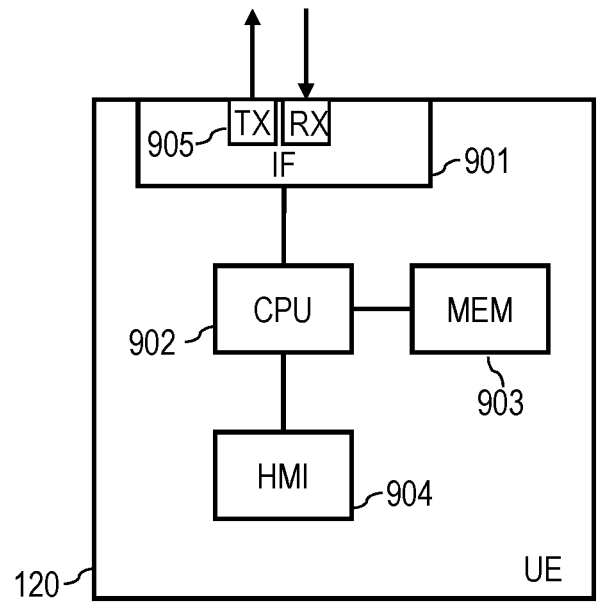
FIG. 8 schematically illustrates a terminal configured to execute the measurement of the signal quality.

FIG. 8 schematically illustrates the UE 120. The UE 120 comprises a processor 902, e.g., a multi-core processor. The processor 902 is coupled with a memory 903, e.g., a non-volatile memory. The processor 902 is further coupled with a human machine interface (HMI) 904. Via the HMI 904, information may be output to a user and/or information may be input from a user.

The UE 120 further comprises a data interface 901. The data interface 901 further comprises an analogue transceiver 905 including a transmitter stage and a receiver stage. The analogue transceiver 905 is configured to wirelessly send and/or receive (transceive) on various bands 200 of the cells 101-103 of the cellular network 100. The data interface 901 facilitates communication with the cellular network 100 in, both, UL and DL direction via the analogue transceiver 905.

The memory 903 may store program code that may be executed by the processor 902. Executing the program code may cause the processor 902 to perform techniques with respect to executing the measurement of the signal quality of a signal received on the measurement band 300-316 as disclosed herein. Executing the program code may cause the processor 902 to receive control messages 801, 811, 812, 822 according to various scenarios disclosed herein which prompt execution of the measurement of the signal quality; and sending of a report message 803, 814, 824 according to various scenarios disclosed herein which includes an indicator of the measured signal quality.

Figure 9:
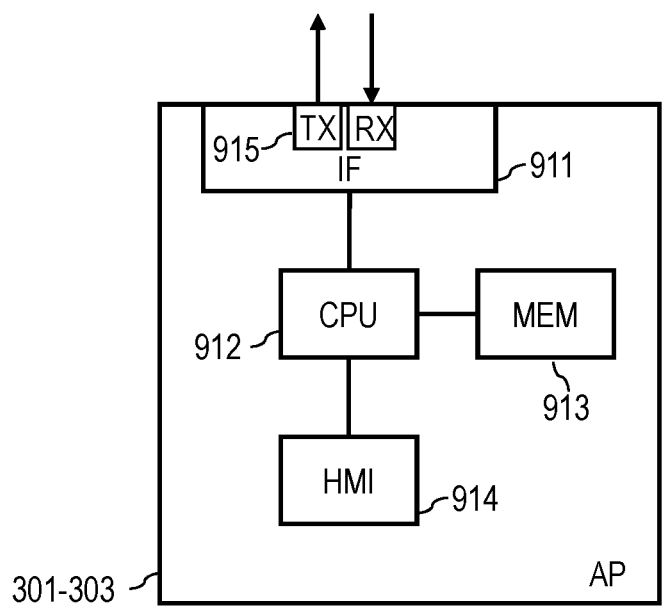
FIG. 9 schematically illustrates an access point node establishing a given cell of the plurality of cells of the cellular network.

FIG. 9 illustrates an access point node 301-303 in greater detail. E.g., the access point node may be an evolved Node B (eNB). The access point node 301-303 includes a processor 912, e.g., a multi-core processor. The processor 912 is coupled with a memory 913, e.g., a non-volatile memory. The processor 912 is further coupled with an HMI 914. Information may be output to a user via the HMI 914 and it may be received from a user via the HMI 914. The access point node 301-303 further comprises a data interface 911. The data interface 911 comprises an analogue transceiver 915 which is configured to wirelessly transceive on band 200 of the respective cell 101-103 of the cellular network 100 served by the access point node 301-303. The data interface 911 may be configured to communicate with the UE 120 via the analogue transceiver 915 in, both, UL and DL direction.

The memory 913 may store program code that may be executed by the processor 912. Executing the program code may cause the processor 912 to perform techniques as disclosed herein with respect to prompting the UE 120 to perform the measurement of the signal quality of the signal received on the measurement band 300-316. In particular, execution of the program code may cause the processor 912 to send a control message via the data interface 911/the analogue transceiver 915 to the UE 120, the control message 801, 811, 812, 822 prompting the UE 120 to execute the measurement. Further, execution of the program code may cause the processor 912 to receive a report message 803, 814, 824 via the data interface 911/the analogue transceiver 915 from the UE 120, the report message 803, 814, 824 indicating the measured signal quality.

Figure 10:
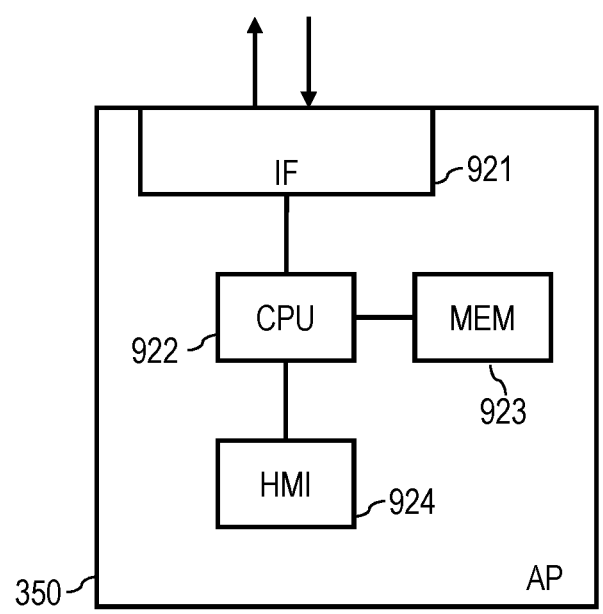
FIG. 10 schematically illustrates a network node of a core of the cellular network according to various embodiments.

FIG. 10 illustrates the network node 350 of the core network. E.g., the network node 350 may be a gateway node such as the Serving Gateway Node (SGW) or the Packet Gateway Node (PGW). The network node 350 comprises a processor 922, e.g., a multi-core processor. The network node 350 further comprises a memory 923, e.g., a non-volatile memory. The network node 350 further comprises a HMI 924. Information may be output to a user via the HMI 924 and may be received from a user via the HMI 924. The network node 350 further comprises the data interface 921. The data interface 921 is configured to communicate with the UE 120 in, both, UL and DL direction.

The memory 923 may store program code that may be executed by the processor 922. Executing the program code may cause the processor 922 to perform techniques as disclosed herein with the with respect to prompting the UE 122 perform the measurement of the signal quality of the signal received on the measurement band 300-316. In particular, execution of the program code may cause the processor 912 to send a control message 801, 811, 812, 822 via the data interface 921 to the UE 120, the control message 801, 811, 812, 822 prompting the UE 120 to execute the measurement. Further, execution of the program code may cause the processor 922 to receive a report message 803, 814, 824 via the data interface 921 from the UE 120, the report message 803, 814, 824 indicating the measured signal quality.

Figure 11:
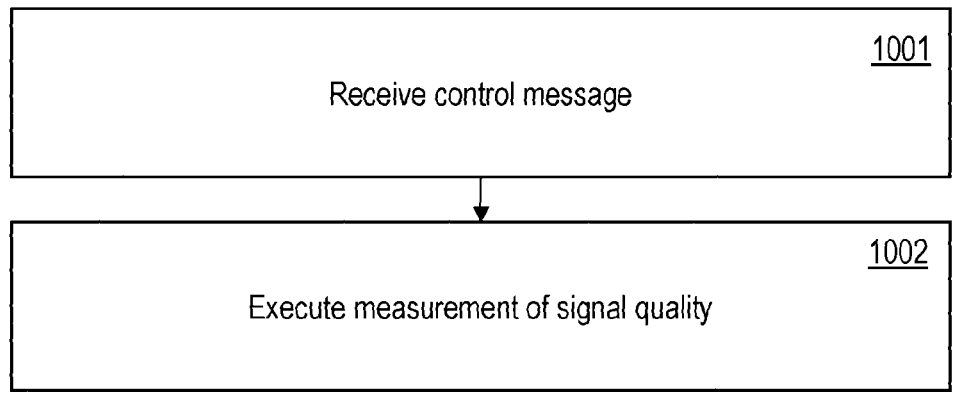
FIG. 11 is a flowchart of a method according to various embodiments, wherein the method may be executed by the terminal of FIG. 8.

E.g., execution of the program code stored in the memory 903 of the UE 120 may cause the processor 902 to execute the method as illustrated by the flowchart of FIG. 11. First, a control message is received, 1001. The control message 1001 indicates a measurement band 300-316. The control message prompts the UE 120 to execute a measurement of a signal quality of a signal received in the measurement band 300-316. At 1002, the measurement of the signal quality of the signal received in the measurement band 300-316 is executed. Optionally, a report message may be sent to the cellular network 100, the report message indicating the measured signal quality (not shown in FIG. 11).

Figure 12:
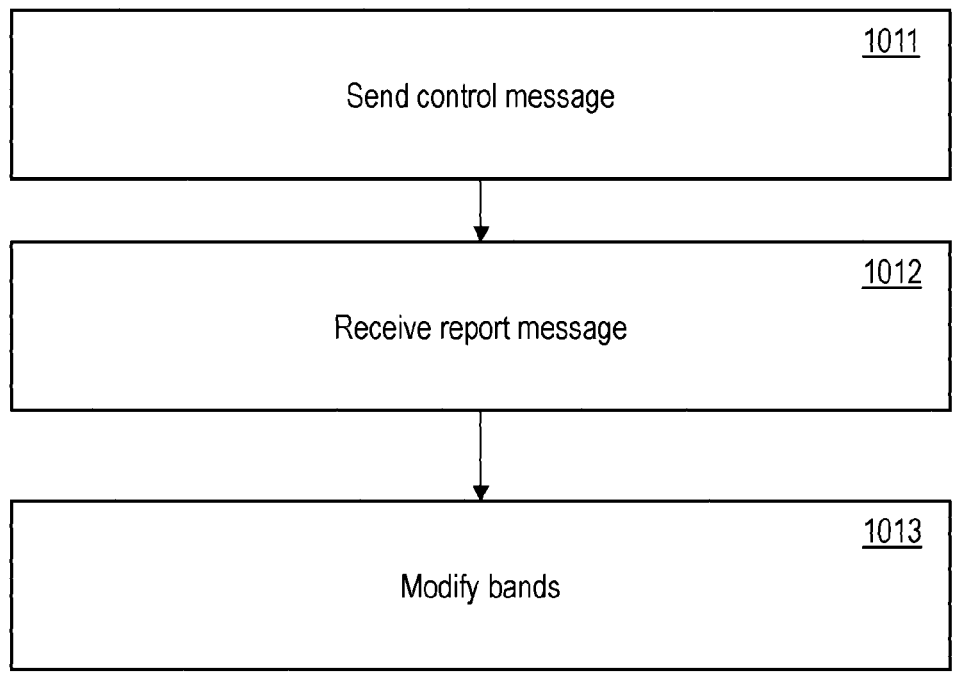
FIG. 12 is a flowchart of a method according to various embodiments.

E.g., executing the program code stored in either the memory 913 of one of the access point nodes 301-303 or the memory 923 of the network node 350 may cause the respective processor 912, 922 to execute the method as illustrated in the flowchart of FIG. 12. First, a control message is sent, 1011. The control message as sent in 1011 generally corresponds to the control message as received in 1001.

Next, the report message is received, 1012. The report message indicates the measured signal quality.

At 1013, the band 200 of at least one cell 101-103 of the cellular network 100 is modified based on the measured signal quality. 1013 is an optional step.

Figure 13:
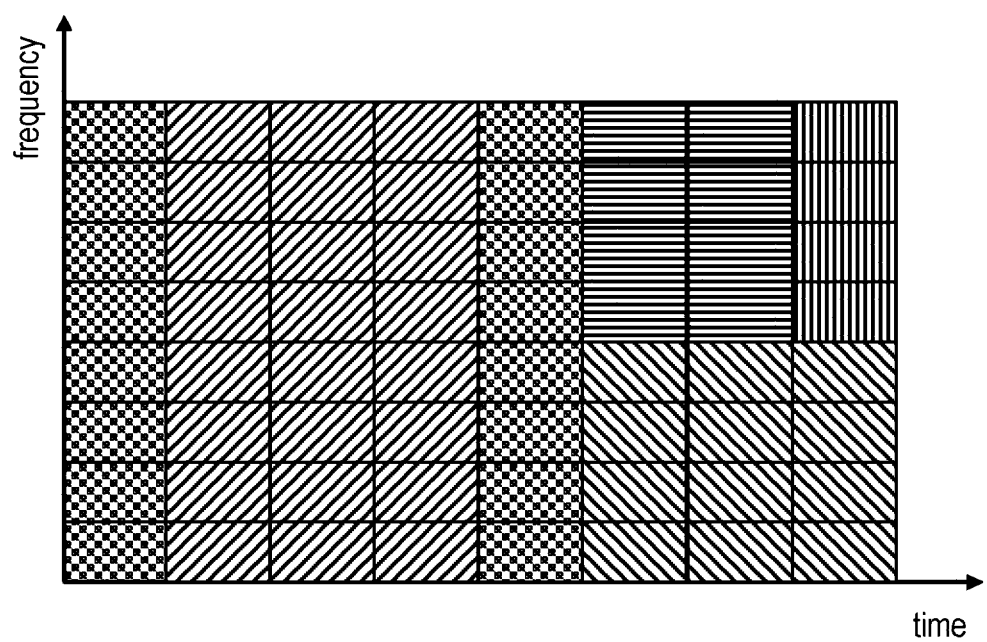
FIG. 13 illustrates a time-frequency resource scheme which is dynamically adjusted as a function of time depending on report messages received by the cellular network, the report message is indicating the measured signal quality of the measurement band.
Figure 13:
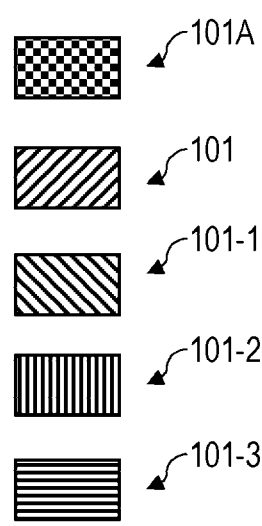

FIG. 13 illustrates aspects with respect to modifying the band 200 of a given cell 101-103 as a function of time. FIG. 13 illustrates schematically the time-frequency resource allocation scheme. As can be seen, over the course of time, a band of a control channel 101A occupies the entire bandwidth and is not modified, i.e., is time invariant.

Initially, the band of a physical payload channel of the cell 101 occupies the entire band 200 of the depicted frequencies. However, after a certain period of time, sub-cells 101-1-101-3 are defined by modification of the band 200 of the cell 101. This may be referred to as network or resource slicing.

Such techniques of network slicing may find application in a transmission resource allocation scheme that relies on dividing the total available bandwidth between various users or classes/types of users. The resource grid as illustrated in FIG. 13 may be shared between the various sub-cells 101-1-101-3. Different sub-cells 101-1-101-3 can be multiplexed within the total available bandwidth, wherein the sub-cells 101-1-101-3 are using parts of the same time/frequency resource grid.

Based on the techniques as disclosed above regarding the arbitrary definition of the measurement bands 300-316, information may available that allows to effectively modify the bands 200 of the various cells 101-103, 101-1-101-3. In particular, the techniques as illustrated above allow coexistence of, both, narrowband and wideband systems that use different parts of the available frequency spectrum. It becomes possible to optimize the bands of the various cells with respect to different use cases and/or device capabilities.

Based on the arbitrarily defined measurement band 300-316, a scheduler of the cellular network 100 may flexibly obtain in-depth information about different ways of utilizing the available spectrum—in particular, information can be available by flexibly dimensioning measurement bands 300-316 that are not limited to the bands of cells 101-103 currently in use. These techniques thus allowed to employ the spectrum more flexibly with the bands 200 of different cells 101-103 being modified as a function of time based on, e.g., techniques of network slicing.

Although the invention has been shown and described with respect to certain preferred embodiments, equivalents and modifications will occur to others skilled in the art upon the reading and understanding of the specification. The present invention includes all such equivalents and modifications, and is limited only by the scope of the following claims.

E.g., while above various examples have been disclosed with respect to measurement of the signal received for DL transmission, similar techniques may be readily applied for a signal received for UL transmission.

E.g., while above various examples have been disclosed with respect to the 3GPP LTE RAT, similar techniques may be readily applied to different kinds and types of RATs.

The invention claimed is:

1. A device, comprising:
an analogue transceiver configured to wirelessly transceive on bands of at least one cell of a cellular network,
a data interface coupled with the analogue transceiver and configured to communicate, via the analogue transceiver, with the cellular network,
at least one processor coupled with the data interface and configured to receive, from the cellular network and via the data interface, at least one control message, the at least one control message indicating a measurement band, wherein the at least one processor is configured to control the analogue transceiver to execute a measurement of a signal quality of a signal received on the measurement band, wherein the measurement band differs from the bands used by the cellular network.

2. The device of claim 1, wherein the at least one control message includes an indicator indicating the measurement band in absolute terms.

3. The device of claim 1, wherein the at least one control message includes an indicator indicating the measurement band in relative terms with respect to at least one of a bandwidth of the band of a target cell of the at least one cell and a center frequency of the band of the target cell.

4. The device of claim 3, wherein the at least one control message includes elements selected from the group comprising: an indicator indicating a bandwidth of the band of the target cell; an indicator indicating a center frequency of the band of the target cell; and an indicator indicating the target cell.

5. The device of claim 3, wherein the at least one processor is configured to receive, from the cellular network via the data interface on the band of the target cell in a broadcast transmission, at least one further control message, the at least one further control message including an indicator indicating the bandwidth of the band of the target cell.

6. The device of claim 3, wherein the band of the target cell includes the measurement band.

7. The device of claim 1, wherein the at least one processor is configured to receive, from the cellular network via the data interface on the band of a connected cell of the at least one cell, the at least one control message, wherein the device is connected to the cellular network via the connected cell.

8. The device of claim 7, wherein the at least one control message includes an indicator indicating the measurement band in relative terms with respect to at least one of a bandwidth of the band of a target cell of the at least one cell and a center frequency of the band of the target cell, and wherein the connected cell is the target cell or is different from the target cell.

9. The device of claim 1, wherein the at least one processor is configured to send, to the cellular network and via the data interface, a report message, the report message including an indicator indicating the measured signal quality.

10. The device of claim 1, wherein the at least one control message indicates a time schedule, wherein the at least one processor is configured to control the analogue transceiver to serially execute a plurality of time-spaced measurements of the signal quality of signals received on the measurement band based on the time schedule.

11. The device of claim 1, wherein the at least one control message indicates a plurality of measurement bands, wherein the at least one processor is configured to control the analogue transceiver to execute measurements of the signal qualities of signals received on each one of the plurality of measurement bands.

12. The device of claim 11, wherein the at least one control message includes an indicator indicating the measurement band in relative terms with respect to at least one of a bandwidth of the band of a target cell of the at least one cell and a center frequency of the band of the target cell, and wherein the plurality of measurement bands are arranged adjacent to each other and include the band of the target cell.

13. The device of claim 1, wherein the measured signal quality is selected from the group comprising: a received signal strength; a Receive Signal Strength Indicator; an average total received power of a plurality of reference symbols; a received signal power; a Reference Signal Received Power; a relation between a received signal strength and a received signal power; a Reference Signal Received Quality.

14. A method, comprising:

receiving, from a cellular network, at least one control message, the at least one control message indicating a measurement band, controlling an analogue transceiver to execute a measurement of a signal quality of a signal received on the measurement band, wherein the analogue transceiver is configured to wirelessly transceiver on bands of at least once cell of a cellular network, wherein the measurement band differs from the bands used by the cellular network.

15. A method, comprising:

receiving, from a cellular network, at least one control message, the at least one control message indicating a measurement band, controlling an analogue transceiver to execute a measurement of a signal quality of a signal received on the measurement band, wherein the analogue transceiver is configured to wirelessly transceiver on bands of at least once cell of the cellular network, wherein the measurement band differs from the bands used by the cellular network, wherein the method is executed by the device of claim 1.

16. A network node of a cellular network, comprising:

a data interface configured to communicate with a terminal connected with the cellular network via a connected cell of at least one cell of a cellular network, at least one processor coupled with the data interface and configured to send, to the terminal and via the data interface, at least one control message, the at least one control message indicating a measurement band and prompting the terminal to execute a measurement of a signal quality of a signal received on the measurement band, wherein the measurement band differs from bands used by the cellular network.

17. The network node of claim 16, wherein the at least one processor is configured to receive, from the terminal and via the data interface, a report message, the report message including an indicator indicating the measured signal quality.

18. The network node of claim 17, wherein the at least one processor is configured to modify the bands of the at least one cell depending on the measured signal quality.

19. A method, comprising:
sending, to a terminal connected with a cellular network via a connected cell of at least one cell of a cellular network, at least one control message, the at least one control message indicating a measurement band and prompting the terminal to execute a measurement of a signal quality of a signal received on the measurement band,
wherein the measurement band differs from bands used by the cellular network.

20. The method of claim 19,
wherein the method is executed by a network node of a cellular network, comprising:
- a data interface configured to communicate with a terminal connected with the cellular network via a connected cell of at least one cell of the cellular network,
- at least one processor coupled with the data interface and configured to send, to the terminal and via the data interface, at least one control, the at least one control message indicating a measurement band and prompting the terminal to execute a measurement of a signal quality of a signal received on the measurement band, wherein the measurement band differs from bands used by the cellular network.

* * * * *

UNITED STATES PATENT AND TRADEMARK OFFICE
CERTIFICATE OF CORRECTION

PATENT NO. : 9,942,786 B2
APPLICATION NO. : 14/982337
DATED : April 10, 2018
INVENTOR(S) : Rickard Ljung and Peter C. Karlsson Page 1 of 1

It is certified that error appears in the above-identified patent and that said Letters Patent is hereby corrected as shown below:

In the Claims

Column 14, Line 30, replace "transceiver" with "transceive";

Column 14, Line 31, replace "once" with "one";

Column 14, Line 41, replace "transceiver" with "transceive";

Column 14, Line 42, replace "once" with "one".

Signed and Sealed this
Twenty-first Day of August, 2018

Andrei Iancu
*Director of the United States Patent and Trademark Office*